US009672377B2

(12) United States Patent
Demirli et al.

(10) Patent No.: US 9,672,377 B2
(45) Date of Patent: *Jun. 6, 2017

(54) SYSTEM AND METHODS FOR SECURE COLLABORATIVE COMMUNICATION

(71) Applicant: MINDHIVE INC., New York, NY (US)

(72) Inventors: Oya Demirli, New York, NY (US); George Dalke, Claremont, NH (US)

(73) Assignee: Mindhive Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,651

(22) Filed: Jul. 2, 2015

(65) Prior Publication Data

US 2016/0012250 A1 Jan. 14, 2016

Related U.S. Application Data

(60) Provisional application No. 62/107,440, filed on Jan. 25, 2015, provisional application No. 62/023,444, filed on Jul. 11, 2014.

(51) Int. Cl.
| | |
|---|---|
| *G06F 7/04* | (2006.01) |
| *G06F 17/30* | (2006.01) |
| *H04N 7/16* | (2011.01) |
| *G06F 21/62* | (2013.01) |
| *H04L 29/06* | (2006.01) |

(Continued)

(52) U.S. Cl.
CPC ........ *G06F 21/6245* (2013.01); *H04L 63/102* (2013.01); *H04L 67/42* (2013.01); *H04W 12/02* (2013.01); *H04W 12/08* (2013.01); *H04L 63/108* (2013.01)

(58) Field of Classification Search
CPC ... G06F 21/6245; H04L 63/102; H04L 67/42; H04L 63/108; H04W 12/02; H04W 12/08
USPC .......................................................... 726/28
See application file for complete search history.

(56) References Cited

U.S. PATENT DOCUMENTS

| | | | |
|---|---|---|---|
| 7,627,652 B1 * | 12/2009 | Commons ........... | H04L 67/1097 709/213 |
| 8,621,652 B2 * | 12/2013 | Slater, Jr. ............ | G06F 17/3089 726/28 |

(Continued)

FOREIGN PATENT DOCUMENTS

WO      2012057997 A1      5/2012

OTHER PUBLICATIONS

Qiuming Zhu; Topologies of agents interactions in knowledge intensive multi-agentsystems for networked information services; University of Nebraska at Omaha; year:2006; p. 1-16.*

(Continued)

*Primary Examiner* — Monjour Rahim
(74) *Attorney, Agent, or Firm* — Brown Rudnick LLP

(57) ABSTRACT

Systems and methods including are provided including computing devices operable to divide content into component parts of content data and/or editing parameters which may be individually attributed to their respective authors. Content and editing parameters may be sent and viewed separately and may have different privacy parameters set by their respective authors. Computing devices may be operable to synthesize and display edited content from separate components including content and privacy parameters.

14 Claims, 7 Drawing Sheets

(51) Int. Cl.
*H04W 12/02* (2009.01)
*H04W 12/08* (2009.01)

(56) References Cited

U.S. PATENT DOCUMENTS

| | | | | |
|---|---|---|---|---|
| 2004/0019801 | A1* | 1/2004 | Lindholm | G06F 21/10 726/7 |
| 2006/0280297 | A1* | 12/2006 | Fukaya | H04L 9/3273 380/28 |
| 2006/0286536 | A1* | 12/2006 | Mohler | G09B 5/00 434/350 |
| 2010/0042690 | A1* | 2/2010 | Wall | H04L 51/046 709/206 |
| 2012/0109728 | A1* | 5/2012 | Sparks | G06Q 30/0214 705/14.16 |
| 2013/0218829 | A1* | 8/2013 | Martinez | G06F 21/6272 707/608 |
| 2014/0164776 | A1* | 6/2014 | Hook | H04L 9/14 713/171 |

OTHER PUBLICATIONS

Notification of Transmittal of the International Search Report and the Written Opinion of the International Searching Authority for International Application No. PCT/US2015/039030 Dated Dec. 17, 2015 (9 Pages).

* cited by examiner

SYSTEM AND METHODS FOR SECURE COLLABORATIVE COMMUNICATION

CROSS-REFERENCE TO RELATED APPLICATIONS

This application claims priority to, and the benefit of, both U.S. Provisional Patent Application Ser. No. 62/023,444, filed Jul. 11, 2014, and U.S. Provisional Patent Application Ser. No. 62/107,440, filed Jan. 25, 2015, the contents of each of which are incorporated by reference.

FIELD OF THE INVENTION

The invention generally relates to a tool for secure, collaborative communication across a network.

BACKGROUND

Computers and mobile devices are ubiquitous today. These devices are often equipped with network connectivity, digital cameras, microphones, and other means of capturing, creating, and sharing digital media and content. The ease with which people can create and share content can create several problems. People often create and share personal and private content. They may select a few, close individuals to share this content with but once the content is in the digital universe, they have lost control of it. This can lead to content which an author intended to be private being widely dispersed and viewed in contexts which the author did not anticipate or prepare for. Unanticipated distribution of private content can have negative effects on an individual's personal and professional life with important and costly ramifications.

Content sharing and distributed collaboration is also used in the professional world where security concerns may be an even higher priority. The unintentional loss of private data in these environments can enable corporate espionage, lead to the loss of intellectual property, the unwanted dissemination of information which might damage a company's public image, and other serious problems. Unwanted dissemination can occur through loss of privacy control as described above, or through theft of data.

Despite existing security methods, each time data is transferred, it is at risk of being intercepted and deciphered by unintended parties and current distributed collaboration methodologies often require the repeated transfer of content back and forth between collaborators. This repeated transfer not only carries an increased risk of data theft but takes up large amounts of bandwidth, especially with hi-definition video and other complex forms of digital media. Additionally, content may become degraded after the repeated compression, encryption, decryption, and decompression involved in distributed collaboration using current technologies. Furthermore, transfers between the mobile devices where much of this content is created, edited, and shared, can quickly lead to very costly data charges for the collaborators.

Another problem with current distributed collaboration methodologies is the division of authorship and ownership rights for individual contributions to collaboratively created content. An original author may create content but someone else may significantly modify and extend the content in a collaborative environment. Dividing ownership and control is difficult and the problem intensifies as more and more authors collaborate on a single piece of content. If all authors individually control the whole content, then individual authors lose control of privacy and distribution. If control is retained jointly, then a single author can effectively end collaboration and hold up distribution of other authors' contributions. These problems can lead to disagreements among collaborators, theft of ideas, inequitable distribution of profits, and potentially valuable content never being shared with the public.

SUMMARY

The present invention provides an application that divides a single electronic file or piece of content into constituent components with separate ownership and control of those components resting with their individual authors. The invention has multiple uses in collaborative file creation where multiple authors contribute to a single piece of content. For example, a first author may create a spreadsheet and share it with a second author who adds additional data to the spreadsheet. Ownership of the spreadsheet is divided among the first and second owner based on their contribution. Accordingly, each author would be able, using systems and methods of the invention, to control privacy and sharing for their individual contribution. The first author could share the spreadsheet with a third party but the third party would not be able to see the second author's additional data unless the second author permitted the third party to. An additional benefit of the division of a piece of content into constituent components is efficient data transfer in collaborative creation of content. Applications of the invention are configured to compile components into a final piece of content. Accordingly, in collaborative situations, where multiple parties are exchanging edits to a piece of content, instead of having to transfer the most recent version of the content back and forth between authors, only information regarding the most recent edit needs to be sent and applications of the invention can synthesize the edited content from the previous version. Systems and methods of the invention can therefore be used to minimize data transfers, saving both time and money in collaborations.

The invention generally relates to systems and methods for content sharing and collaboration over a network by dividing content into components including content data and editing parameters where ownership and privacy rights for each component are retained by the individual author(s) of each component. Systems and methods of the invention include computing devices operable to receive the content components (i.e., content data and editing parameters), and output edited content to an appropriate output device (e.g., a display or speakers). Each component may be assigned a content identifier (e.g., by an author, a computing device, or a server) which can act as a place holder for the actual content, which may be retrieved from a server by a computing device and can be combined with editing parameters and/or other content to synthesize and output the collaborative or edited content. Computing devices according to systems and methods of the invention may also tolerate missing data and may still compile edited content for output based on the content data and editing parameters available to it (e.g., where permission for one or more components are withheld by their respective authors).

The invention, through dividing content into components, allows for individualized security and privacy controls and avoids the division of ownership and privacy issues associated with distributed collaboration according to current techniques.

By isolating content and editing parameter components, each iteration of the collaborative content can be recalled easily as each additional edit exists as a separate parameter and does not affect the original content which can still be retained on and retrieved from a server. Furthermore, the additional content or editing parameters at each stage of the collaboration may be recalled and used by a computing device of the invention in order to synthesize the edited content as it existed during that iteration. Content may include, among other things, captured still images, captured audio, captured video, text, or various types of graphics.

In certain embodiments, systems and methods of the invention relate to storing content on a server and referencing the content by a content identifier. Servers according to the invention can refer to a tangible, non-transitory memory coupled to a processor and may be coupled to a communication network, or may include, for example, Amazon Web Services, cloud storage, or other computer-readable storage. According to the systems and methods of the invention, edited content may be shared among collaborators by sending a string of content identifiers and editing parameters directly between the collaborators on their computing devices. Computing devices according to systems and method of the invention may retrieve the content associated with each content identifier (with permission from each respective content author) and combine them with the editing parameters in order to output the edited content. Accordingly, in certain embodiments, each collaborator only needs to download a piece of content data one time. Subsequently, the collaborators may only need to send separate editing parameters back and forth directly as they create a collaborative product. The methods and systems of the invention thus require fewer data transfers which, in turn, are of a smaller size. This saves bandwidth and avoids the high costs associated with large data transfers as mentioned earlier. In certain embodiments, a server can tailor content downloads to the device characteristics of the requestor's computing device (e.g., sending a lower resolution image to a computing device with a lower resolution display as opposed to sending a larger file which is paired down at the receiving end before being displayed), thereby saving bandwidth.

In certain embodiments, data transfers between collaborators may not require encryption as they may consist of content identifiers, wherein retrieval of the actual content data can be policed by the server, and editing parameters which, without the context of the content data, may not pose a security risk. Accordingly, systems and methods of the invention may allow for a fewer number of compressions and encryptions and therefore minimize the associated potential for content degradation. Furthermore, by minimizing the number of transfers of private or secure content through the use of content identifiers, the potential for data theft is minimized.

According to systems and methods of the invention, privacy parameters may be used which allow an author to choose to make content public or private and, if private, grant viewing and/or editing permissions to individual viewers or populations or viewers. A privacy parameter may be a set of permissions which allow select individuals or groups of individuals to download the content (or a volatile copy of the content) from the server. A privacy parameter can be a population characteristic such as age, gender, etc. allowing only people within the select settings (e.g., males between 20 and 25 years old) to access the content from the server. In certain embodiments, a privacy parameter may include biometric and other sensory information. The privacy parameter can be entered into a computing device by the author and can be sent from the computing device to the server along with the associated content through the communication network. A content identifier can be openly transferred to any user by any other user through computing devices over a communication network. This is because actual distribution of the content is controlled at the server level. In order for a user (requestor) to view content after receiving an identifier, the requestor's computing device attempts to retrieve the referenced content from the server by sending the identifier along with the user credentials for the requestor. User credentials may include, for example, a user name, password, electronic mail address, phone number, age, gender, interests, physical attributes, geographic location, education, nationality, biometric and other sensory information. The server may compare the requestor's user credentials with the privacy parameters in order to determine if the requestor has permission to access the content. If the requestor is within the privacy parameters, then the server may send the content or a volatile copy of the content to the requestor's computing device. If the requestor is not within the privacy parameters and does not have permission to receive the content, the server may take any of several steps, including, not sending the content to the requestor's computing device, sending a message to the requestor's computing device indicating the lack of permission, send a notification to the author's computing device regarding the request, send an inquiry to the author's computing device regarding whether or not the author would like to permit the requestor to view the content and/or whether the author would like to change the privacy parameters for the content.

Content, according to the invention, may be shared publically or privately, with or without security and/or privacy settings. In certain embodiments, copies of content may be downloaded from the server in a volatile format (e.g., that cannot be copied or forwarded or that may become unreadable after a certain amount of time after download, a certain number of viewings, a certain number of viewing time, or some combination thereof). These volatility parameters may be set by the server or may be selected by the content's author and input into a computing device to be transferred to the server along with the content. Accordingly, the content can be distributed to the individuals of the author's choosing while the author retains distribution and privacy control of the content, thereby avoiding the aforementioned problems associated with unauthorized distribution of private content.

In certain cases, the content components may only be viewed by computing devices of the invention or by a proprietary viewer/synthesizer computer program. In such cases, the security, privacy, and/or volatility parameters may be applied by the server, by the computing device, or by the viewer/synthesizer computer program.

An author may send content to a server from a computing device through a communication network which may include, for example, a local area network, a wide area network, the internet, a mobile telecommunications network, or a combination thereof. A server of the invention, upon receiving content from an author, may store the content in its memory or another data storage device and may assign an identifier to the content. The server may also assign ownership rights for the content to the author or otherwise associate the content with the author. The server may send the identifier to the author so that the author may share the identifier with other individuals.

The identifier may be location based, referencing, for example, a storage location on a networked server from where the content may be retrieved, or content based in that it may reference the substance of the content, for example a file name or a portion of computer code specific to the content, independent of storage location.

Methods and systems of the invention may be performed by a server or a distributed computing network or peer-to-peer file sharing network comprising a plurality of computing devices wherein the content, including components thereof, may be sent to, stored in, and/or sent from a plurality of computing devices. Content may be divided into individual components or subdivisions thereof which, in turn, may be received or downloaded from one or more separate computing devices in communication with the requestor's computing device via a communications network. Content subdivision information may be included within an identifier. Data transfer speeds may be increased through simultaneous downloads of content subdivisions by the requestor in cases where the bandwidth of the requestor is greater than that of a server comprising computing device. Individual subdivisions of a single piece of content may be requested, sent, and received at separate times and from different sources.

The identifier can include information including data regarding division and assembly of the content or components thereof into subdivisions, security information, and/or tracking information such as possible sources of subdivisions or computing devices from which a particular subdivision may be requested and downloaded. In certain embodiments, the identifier may include security information such as a cryptographic hash which may be used to authenticate each subdivision as it is received.

Content may be divided into components such as video, audio, images, gestural commands, sensory data, biometric information, and/or text to enable efficient data transfers of only the components that a requestor wishes or is authorized to observe. Each of the components may be further divided to for efficient data transfers. In some instances, a division may contain more than one type of content.

In certain embodiments, systems and methods of the invention may relate to search functions. Content may be searched based on information contained in the identifier, enabling more efficient searches and may be component based (e.g., text, image, video, or audio). Privacy parameters may prevent a requestor from receiving results for components which are outside of the requestor's observing permissions.

An editing parameter component can include a variety of adjustments to the content ranging from changes to brightness levels of an image to the addition of substantial additional content generated by an editor and added to the original author's content. Editing parameters preferably include an individual equivalent operation that can be distilled or synthesized from a more complex series of editing events. For example, instead of recording and repeating the addition and/or deletion of each character in a textual annotation edit, a computing device according to systems and methods of the invention to recreate edited content on a viewing computing device, the editing computing device may synthesize a single editing parameter which bypasses all the intermediate steps and can change a piece of original content to the final edited form of the content in a single step. Because editing parameters will often be meaningless without the context of the original content, the editing parameters may be sent without security or encryption protocols. As alluded to earlier, an unauthorized interception of a content identifier will not enable the interceptor to access the content from the server unless they have the requisite permission or fall within the privacy parameters.

As noted earlier, a piece of content may comprise two or more pieces of content data and numerous editing parameters from multiple authors or editors. Each component (e.g., content data or editing parameter) may be treated in the same manner as the original content (e.g., uploading content to the server, assigning an identifier, and associating privacy parameters). In such instances the author of each content component can exclusively control the privacy parameters, volatility parameters, and distribution of only their authored component. Each author or editor controls only the privacy parameters for the component of the content which they created.

In certain aspects, the invention includes a system for sharing content over a communication network. The system includes a server coupled to the communication network and comprising a tangible, non-transitory memory coupled to a processor. The server is operable to receive content from an author through the communication network; receive a privacy parameter for the content from the author through the communication network; assign an identifier to the content; send the identifier to the author through the communication network; receive a request for the content, referenced by the identifier, from a requestor through the communication network; and send a copy of the content to the requestor.

In certain embodiments, the content may only be readable for a preselected amount of time. The server may receive the preselected amount of time from the author. In various embodiments, the copy of the content may be only readable for a preselected number of views. Servers of the invention may receive the preselected number of views from the author. In certain embodiments, the copy of the content cannot be copied or forwarded by the requestor.

In various embodiments, the server may be further operable to receive a user credential from the requester; compare the user credential to the privacy parameter; and send the copy of the content to the requestor only when the user credential match the privacy parameter. Servers of the invention may be further operable to receive an editing parameter associated with the content; assign the editing parameter to the identifier associated with the content; and send the editing parameter to the requestor with the copy of the content. Systems of the invention may include a server further operable to send a notification to the author, through the communication network, upon receiving the request for the content. In certain embodiments, the server may be further operable to receive a content release instruction from the author, through the communication network. Content may be an image or a video. The content may be a document or an audio clip.

In certain aspects, the invention includes a system for sharing content over a communication network. The system includes a computing device coupled to the communication network and comprising a tangible, non-transitory memory coupled to a processor. The computing device is operable to receive a content identifier from a second computing device through the communication network; receive an editing parameter from the second computing device through the communication network; send a request for content associated with the content identifier to a server through the communication network; send a user credential to the server through the communication network; receive a copy of the content from the server through the communication network; and display the content modified by the editing parameter.

In certain embodiments, the computing device can be a mobile device, a wearable computing device, or an augmented reality device. According to certain embodiments, the computing device may be further operable to receive the user credential from a user. In various embodiments, the computing device may be further operable to modify the content by the editing parameter. The copy of the content may be only readable for a preselected amount of time or may be only readable for a preselected number of views. In certain embodiments, the copy of the content is of a format that cannot be copied or forwarded by the computing device. In various embodiments, the content may be an image, a video, a document or an audio clip.

In various aspects, the invention includes a system for sharing content over a communication network. The system includes a computing device coupled to the communication network and comprising a tangible, non-transitory memory coupled to a processor. The computing device is operable to send the content to a server through the communication network; receive a privacy parameter from a user; send the privacy parameter to the server through the communication network; receive a content identifier from the server through the communication network; and send the content identifier to a second computing device through the communication network.

In certain embodiments, the computing system is further operable to receive a content readability time value indicative of how long a copy of the content may be viewed by the second computing device and send the content readability time value to the server through the communication network. The computing device may be further operable to receive a notification from the server, through the communication network, upon the server receiving a request for the content. In various embodiments, the computing device may be further operable to receive a content release instruction from the author and send the content release instruction to the server, through the communication network. The content may be an image, a video, a document, or an audio clip. In various embodiments, the computing device may include a mobile device, a wearable computing device, or an augmented reality device.

Systems of the invention may include a computing device further operable to receive editing instructions from a user and synthesize an editing parameter. The computing device may be further operable to send the editing parameter to the second computing device through the communication network. In certain embodiments, the computing device can be further operable to send the editing parameter to the server through the communication network. Servers of the invention may comprise a plurality of computing devices.

DETAILED DESCRIPTION

The invention provides systems and methods for sharing and distributed editing of content over a communication network 517 using servers 511 and/or computing devices. Systems and methods of the invention relate to using separate content files and editing parameters in order to minimize the size of data transfers during a collaborative or distributed editing process. Additionally, systems and methods of the invention may relate to author inputted privacy parameters for content and/or content security mechanisms including limiting content downloads from the server 511 to volatile copies.

Figure 1:
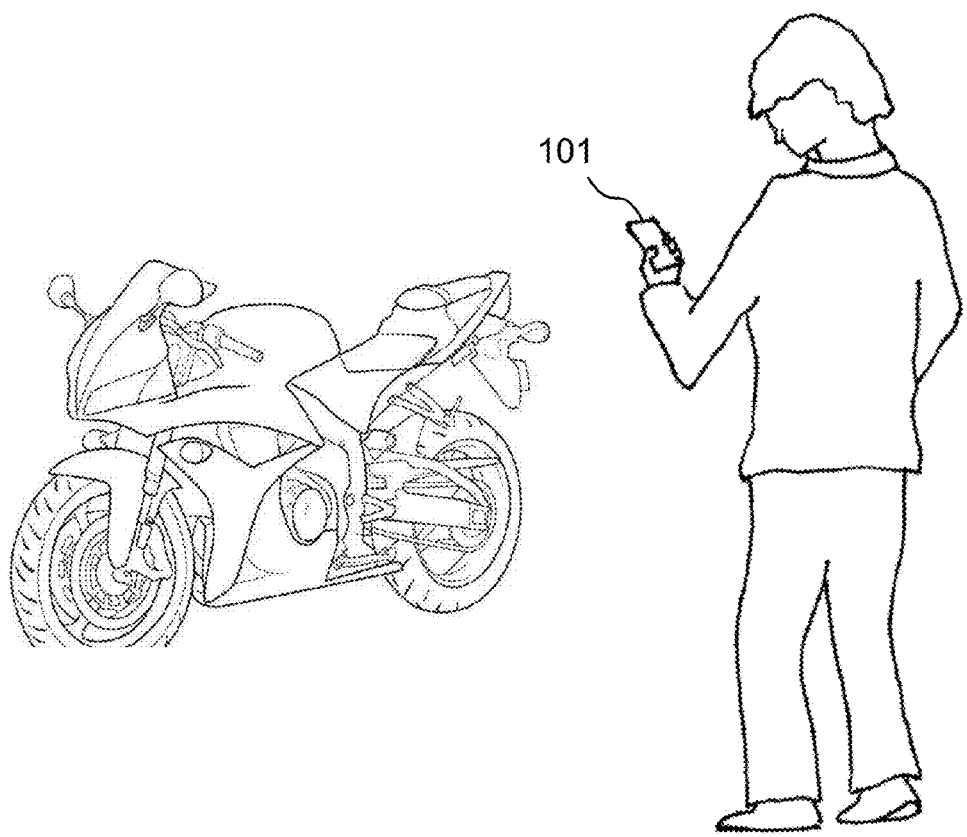
FIG. 1 shows use of a computing device to generate new content.

Content may include, for example, pre-existing, generated, or captured still images, audio, video, text, verbal annotations, vector graphics, or rastor graphics. Content may be generated or captured using an input device (described later) on a mobile device or other computing device 101. In preferred embodiments, content is a computer file capable of being read by a computing device 101 or server 511 of the system. A variety of known programs or applications may be used to generate or capture content and content may be in a variety of known file types including, for example, JPEG, GIF, MPEG, Quick Time File Format (QTFF), ASCII, UTF-8, MIME, .TXT, XML, HTML, PDF, Rich Text Format (RTF), and WordPerfect. FIG. 1 shows a computing device 101 being used to generate new content by capturing a digital image.

Content, according to systems and methods of the invention may be comprised of one or more components which may include one or more pieces of content data created by one or more authors and/or one or more editing parameters created by one or more editors or authors. Content or edited content, according to systems and methods of the invention may be compiled by a computing device 101 or viewer/synthesizer computer program from components (e.g., content data and editing parameters) and output via an appropriate output device (e.g., a display device or speaker). Content may be public or private and these privacy parameters may be selected by an author or editor to apply to their individual component contribution to a piece of edited or collaborative content.

Figure 2:
FIG. 2 shows an exemplary editing screen on a computing device.

In certain embodiments, an author is an individual who sends content to the server 511 through a communication network 517. Servers 511 according to the invention can refer to a tangible, non-transitory memory coupled to a processor and may be coupled to a communication network 517, or may include, for example, Amazon Web Services, cloud storage, or other computer-readable storage. A communication network 517 may include a local area network, a wide area network, or a mobile telecommunications network. In an exemplary embodiment, an author may upload or send content (e.g., a captured image in JPEG format) from a computing device 101 (e.g., a mobile telephone) to a server. The computing device 101 may utilize an application or a computer program configured to provide an interface through which the author may select content and direct the sending, uploading, or sharing of the content to the server. Content may be uploaded by an author with no privacy parameters (i.e., public content). In some embodiments, the author may create a privacy parameter associated with a piece of content and send or upload that privacy parameter to the server 511 along with the content. A privacy parameter may be a selection of one or more individuals or users whom the author has authorized to receive the content. A privacy parameter may also be a set of criteria or population characteristics which define a group that the author has authorized to receive the content. Examples of criteria or population characteristics include, for example, age, gender, interests, physical attributes, geographic location, education, or nationality. In various embodiments, a privacy parameter may include biometric and other sensory information. FIG. 2 illustrates an embodiment of computing device 101 of the system with a display 125 showing an exemplary privacy parameter selection screen. A privacy parameter may be linked to a particular piece of content or may be applied to multiple pieces of content, including all content uploaded by a particular author. In the exemplary embodiment shown in FIG. 2, an author may toggle privacy parameters or permissions for individual users which may apply to all private content uploaded to the server. According to certain systems and methods of the invention, content transferred between the server 511 and a computing device 101 may be compressed and/or encrypted using a variety of methods known in the art including, for example, the Advanced Encryption Standard (AES) specification and lossless or lossy data compression methods.

Upon receiving content from an author, the server 511 may assign an identifier to the content and store the content in its memory. In some embodiments an author or a computing device 101 may assign an identifier to the content and upload the identifier to the server along with the referenced content. In certain embodiments, the identifier is an alphanumeric sequence which is randomly generated by the server. An identifier according to systems and methods of the invention may be unique for each piece of uploaded or received content. In some embodiments, an identifier may be assigned by a computing device 101 before content is sent from the computing device 101 to the server. In these embodiments, the content associated identifier can be sent to the server 511 along with the content. In certain embodiments, the server 511 may also associate the author with the received content. User credentials associated with the author, including, for example, a user name, electronic mail address, or phone number may be recorded and stored along with a particular piece of content received from the author. In certain embodiments, the server 511 may send the identifier to the author via the communication network 517.

In some embodiments, the identifier may be location based in that it may reference a fixed location, for example, a storage location on networked server, where the corresponding content may be accessed and received. In some embodiments, the identifier may be content based in that it references the substance of the content, independent of storage location, for example a file name or a portion of computer code specific to the content. In certain instances, identifiers may comprise a hash, such as a cryptographic hash which corresponds to the content or components thereof including editing parameters. In some embodiments, the identifier may include permission information.

In certain embodiments, the server 511 may receive volatility parameters from the content author which, for example, relate to the viewing time, number of views, or lifespan of content data downloaded from the server. In some embodiments, content may only be downloaded from the server 511 by requestors other than the author in a volatile format. In certain embodiments, content may be formatted so that it can only be compiled from components and/or viewed using a viewer/synthesizer program or on a computing device 101 of the invention. In certain embodiments, privacy parameters and/or volatility parameters may be enforced by a server 511, a computing device 101, and/or a viewer/synthesizer program. According to systems and methods of the invention, the computing device 101 and/or the viewer/synthesizer program may, upon requesting and obtaining identifier referenced content from the server, may receive and/or verify any volatility parameters associated with the content. The computing device and/or the viewer synthesizer program may then enforce those parameters. In certain embodiments, the computing device and/or the viewer synthesizer program may have system write permission, and may erase the content upon expiration of a volatility parameter. In some embodiments, the computing device and/or the viewer synthesizer program may refuse to display the content upon expiration of a volatility parameter. In certain embodiments, the computing device and/or the viewer synthesizer program can periodically review the status of volatile data and apply the restrictions or update the status.

Figure 3:
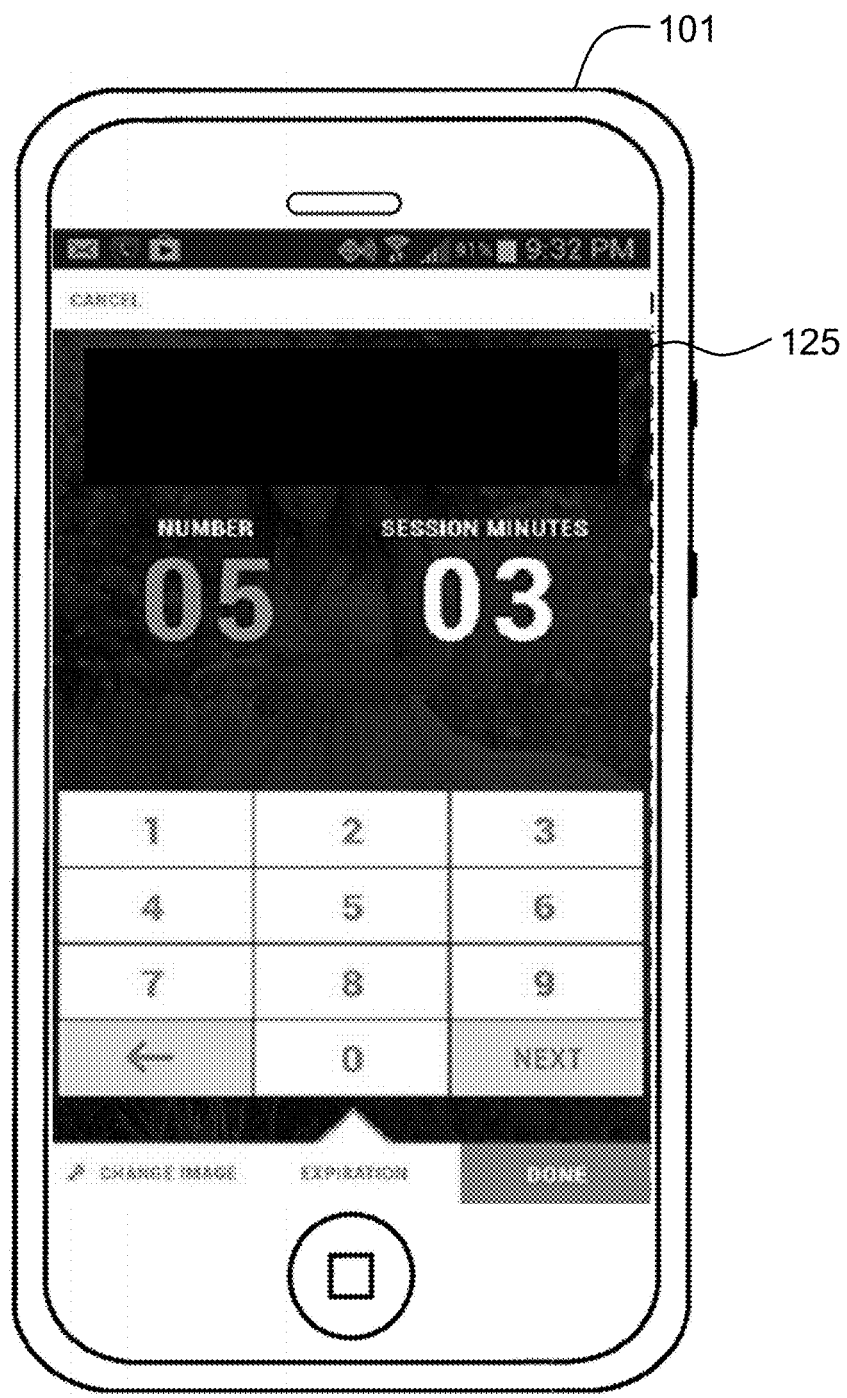
FIG. 3 shows an exemplary computing device displaying content modified by an editing parameter.

In various embodiments, a downloaded copy of content may not be for example, shared, transferred, or copied. Volatile copies of content may have a preset lifespan after which the file is expunged from the computing device 101 on which it is stored or corrupted and made unreadable. In certain embodiments, volatile copies may allow only a limited number of views by the requester (decryption after downloading, may only be viewed for a limited amount of time, or may have some combination of these limitations. For example, a volatile copy of content may be downloaded by a requestor in a volatile format which allows the requestor to view the content five times for thirty seconds each time. Number of view and/or time of view limitations, as described above, may be preset or may be selected for a piece of content or group of content by an author. For example, an author may, upon uploading content to the server, set one or more volatility parameters including a preselected amount of time for viewing or a preselected number of views. These volatility parameters may be applied, for example, on a content basis or on a requestor basis. For example, an author may set a single volatility parameter (e.g., a preselected number of views) for all requestors for an individual piece or group of pieces of content, or may set a single volatility parameter for all content sent to a particular requestor or group of requestors. FIG. 3 illustrates an exemplary embodiment of a computing device 101 with a display 125 allowing a user to set volatility parameters.

An author may select to share content with one or more other users or individuals based on privacy parameters as described above. In certain embodiments, an author can initiate the sharing of content by sending the identifier associated with the content to another user. The identifier may be sent from one computing device 101 to another through the communication network 517. An application or computer program on a computing device 101 may prompt an author to enter instructions regarding who the author wishes to share content with. The computing device 101 may then receive instructions and send the content associated identifier to each selected user or computing device. Alternatively, an author, when sending content to the server, may also send instructions regarding users whom the author wishes to share the content with and the server 511 may then send the content associated identifier to each selected user.

In various embodiments, a user with whom content has been shared may receive an identifier which is associated with the content. The identifier may be received on a computing device 101 and may be sent by another computing device 101 or a server. A requestor, or user requesting content from the server, may send an identifier to the server 511 through a computing device, over a communication network 517. In certain embodiments, the server 511 may then access the content associated with the identifier and send a copy of the content, stored in the server's memory, to the requestor. In certain embodiments, the server 511 will send a volatile copy of the content to the requestor. In some embodiments, the requestor may also send user credentials to the server. Such user credentials may include, for example, a user name, password, electronic mail address, phone number, age, gender, interests, physical attributes, geographic location, education, nationality, or biometric and other sensory information. User credentials may be linked to a specific user, entered once into a computing device 101 and stored in the memory 307 of the computing device 101 to be sent to the server 511 along with content or content requests. In certain embodiments systems and methods of the invention may include the creation of an account in order to access and share content using the system. Creation of an account may include entering user credentials into a computing device 101 and can include creating a user name to associate with the credentials. These user credentials can be uploaded through the communication network 517 to the server 511 and stored in the server's memory. The server, upon receiving the user credentials and the identifier from the requestor may compare the user credentials to any privacy parameter associated with the identified content. If the requestor falls within the privacy parameter, then the server 511 may send the content or a volatile copy of the content to the requestor over the communication network 517. In some embodiments, the server 511 may compare the user credentials from the requestor to volatility parameters received from the author and send a volatile copy of the content to the requestor which matches the volatility parameters associated with the individual content and/or the individual requestor. In certain embodiments, if the user credentials received from the requestor by the server 511 are not within the privacy parameter associated with the requested content, the server 511 may send a notification, through the communication network 517 to the author indicating that a request for private content has been received and that the requestor is not currently permitted to receive the content. The notification may be sent, for example, as an electronic mail, a text message, or through a dedicated portal to a computing device 101 (e.g., an author's mobile telephone) in communication with the server. The computing device, having received a notification may identify the requestor based on the received user credentials and/or prompt the author for permission to release the content to the requestor. In various embodiments, the author may send a one-off authorization to the server 511 instructing the server 511 to release private content to a particular requestor. In some embodiments, an author may revise the privacy parameter associated with the content on a computing device 101 and send, through the communication network 517, an updated privacy parameter associated with a particular piece or group of content to the server.

Systems and methods of the invention further relate to collaborative or distributed editing of content. In some embodiments, systems and methods of the invention relate to computing devices 101 (e.g., mobile telephones, computers, tablets, augmented reality devices, or wearable computing devices 101) operable to combine a piece of content with an editing parameter of set of editing parameters to synthesize edited content for output on an output device (e.g., display) coupled to the computing device. In certain embodiments, an author may share content with a requestor using a server 511 and an identifier as described above.

Figure 4:
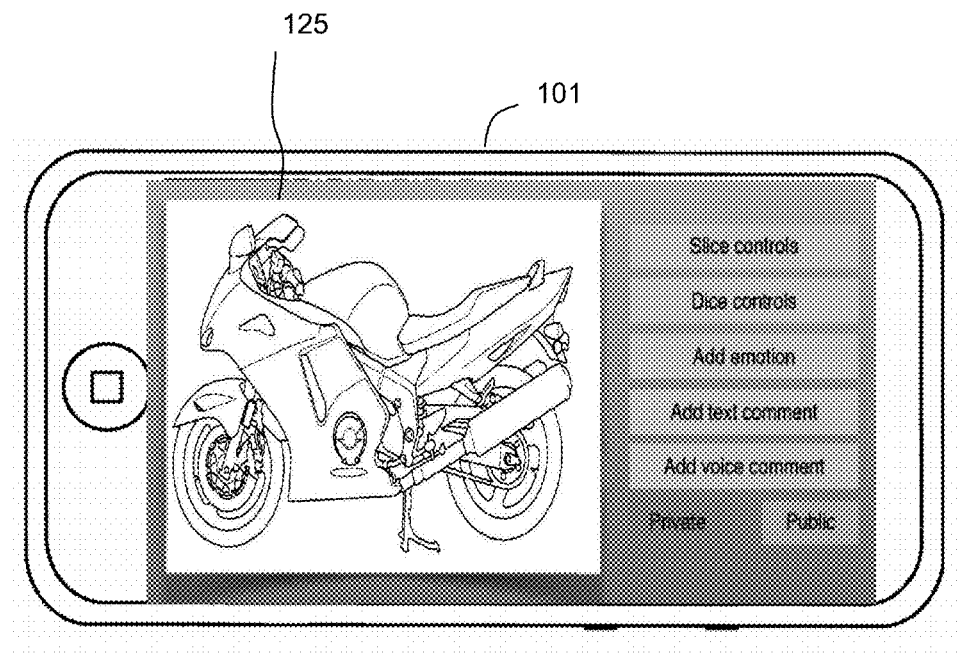
FIG. 4 illustrates a system for sharing content.

Systems and methods of the invention may include computing devices 101 operable to receive editing parameters from the user (editor) through an input device (e.g., keyboard, mouse, touchscreen, or digital camera). Dedicated applications or programs running on the computing device 101 may enable editing of content and record the edits in a separate editing parameter. FIG. 4 illustrates an exemplary embodiment of a computing device 101 according to systems and methods of the invention and operable to allow editing of content by an editor. The computing device 101 is showing the content along with editing controls on a display 125. The exemplary computing device 101 in FIG. 4 may also receive a privacy parameter from the editor which may be associated with any additional content or editing parameters created by the editor (as discussed below). The computing device 101 may then send the editing parameter, privacy parameter, and/or content identifier to another computing device 101 or the server 511 through the communication network 517. Computing devices 101 according to systems and methods of the invention may synthesize an editing parameter from a series of editing steps input into the computing device 101 (e.g., brightness adjustments to an image or track level adjustments to an audio recording) by calculating a single adjustment that can be used to transform the original content to the final edited product, replacing the series of editing steps. An editing parameter may be any annotation, augmentation, overlay, or other change to a piece of content including, for example, audio annotation, text, vector graphics, rastor graphics, video, animation, gestures for wearable computing devices 101, instructions, code for two-dimensional or three-dimensional environments, or a combination thereof. In certain embodiments, an editor may share their edits with another individual or user, including the content's author, by directing a computing device 101 to send a content associated identifier linked to the original content, and a separate editing parameter to the other individual's computing device. The individual receiving the edited content can receive the identifier and the edited content on a computing device 101 operable to synthesize edited content from the two components.

Figure 5:
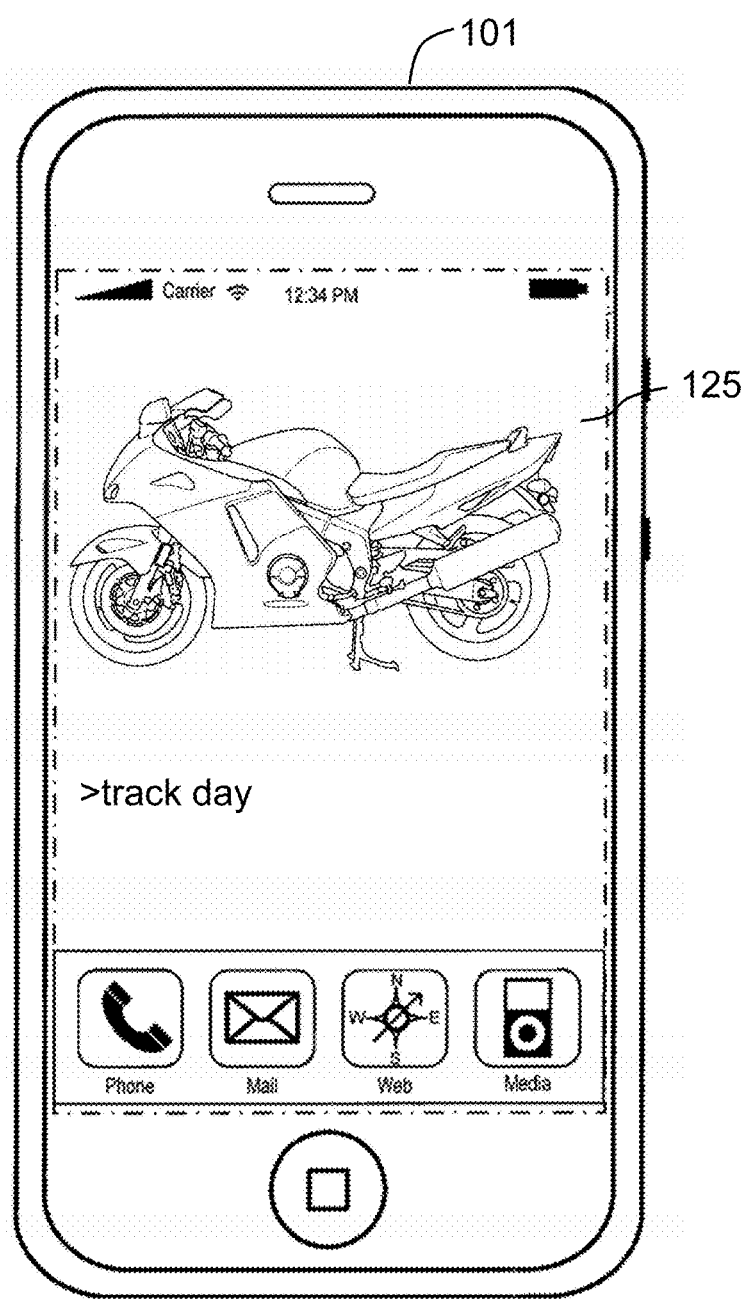
FIG. 5 shows an exemplary privacy parameter selection screen on a computing device display.

FIG. 5 illustrates a computing device 101 according to systems and methods of the invention which is displaying synthesized output on a display 125. The computing device 101 in FIG. 5 has combined a component image with a textual editing parameter to synthesize and display edited content (i.e., a picture of a motorcycle with a comment below). If the content is already stored in the memory 307 of the other individual's computing device, then the computing device 101 can synthesize the edited content for output by combining the received editing parameter and the content already stored on the computing device. If the user does not have the original content in the memory 307 of their computing device, the computing device 101 may be operable to request the content from the server 511 through the communication network 517 via the identifier as described above. In a distributed editing session, each collaborator need only receive the content from the server 511 once which leads to less data being transferred, lower costs where charges are based on the amount of data transferred (e.g., many mobile data plans), and less encryption, compression, decompression, and decryption, which, in certain formats, can lead to data loss.

In certain embodiments, an editor may instruct a computing device 101 to send edited content to another individual that is outside of the content author's original privacy parameter. The computing device 101 may, as described above, send the editing parameter as well as the content identifier to the other individual. The other individual upon receiving the content identifier and the editing parameter may request the content from the server 511 in the manners described above. If the other individual is a requestor whose user credentials are outside of the content author's privacy parameters, the server 511 may handle the request as described above, including, for example, not sending the content to the requestor and/or sending a notification of the request and the requestor's user credentials to the original author. In certain embodiments, editing parameters transferred between computing devices 101 and/or servers 511 may be compressed and/or encrypted. In other embodiments, editing parameters transferred between computing devices 101 and/or servers 511 may be unencrypted. Because the editing parameter is isolated from the content, the editing parameter may not be understood outside of the context of the content and therefore may not require security measures such as encryption. This can further minimize the necessity for encryption and compression and the associated problems therein.

In some embodiments, the editing parameter may be additional content which is created and/or shared as described above. The additional content may be generated on a computing device 101 and augment original content. In certain embodiments, when additional content is used to edit original content on a computing device, the computing device 101 may create an insertion parameter or instruction which can be used to instruct another computing device 101 on how to combine the two component pieces of content (original and additional) to synthesize the edited content. The insertion parameter is separate from the editing parameter and the content and may be transferred among computing devices 101 and the server 511 in the same manners as described above for editing parameters. In certain embodiments, the computing device 101 may receive a privacy parameter from the author of the additional content and send the additional content to the server 511 along with the privacy parameter. Additional content is content and may be sent, received, and processed by a server 511 or computing device 101 in the same manners as described above for content. In embodiments wherein the editing parameter is additional content, the original content and additional content may be combined by a computing device 101 in order to synthesize and output an edited content. Accordingly, in various embodiments according to systems and methods of the invention, authors of specific content may retain privacy control over their authored content even if it is a component of a larger collaborative piece of edited content. Thus, privacy control of collaborative content is simplified.

In certain embodiments, an author, editor, and/or requestor may be a human or a machine such as a computing device. For example, an author of content may be a networked device such as a heart rate monitor wherein the content may be, for instance, an electronic record of an individual's heart rate during a workout. A machine or a computing device may create content, share content, edit content and/or set privacy parameters for content automatically, according to parameters set by a human, and/or some combination thereof.

Figure 6:
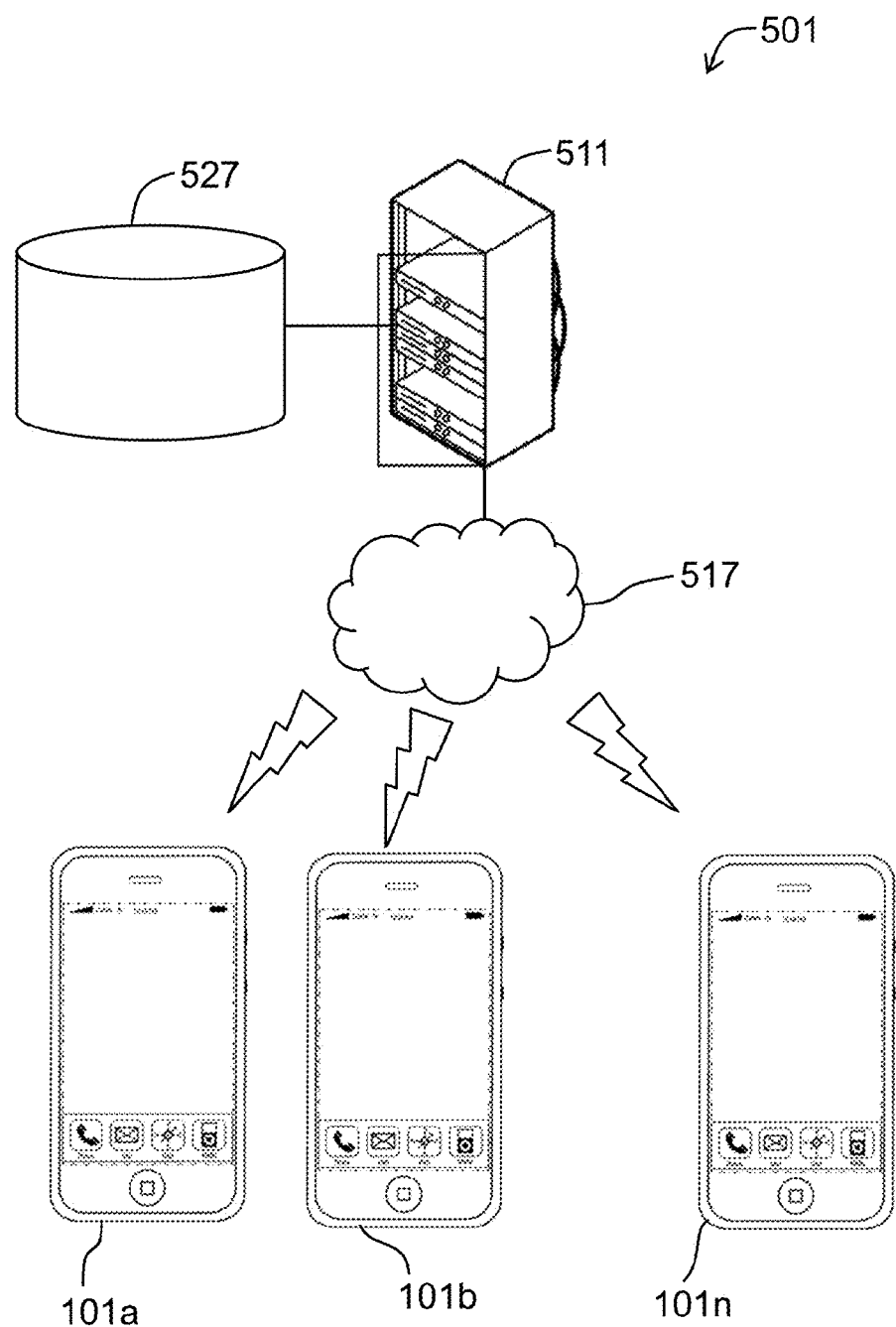
FIG. 6 shows an exemplary computing device displaying a volatility parameter selection screen.

In various embodiments, systems 501 and methods of the invention may relate to a communication network 517 which allows a server 511 coupled to a data storage device 527 to send and receive data to and from any number of computing devices 101a, 101b, . . . , 101n. See FIG. 6. The server 511 of the system 501 may be operable to receive, for example, content, editing parameters, content identifiers, volatility parameters, content requests, user credentials, and/or privacy parameters from the computing devices 101a, 101b, . . . , 101n through the communication network 517 and can store them in its internal memory 307 or in a data storage device 527. The server 511 may be operable to send, for example, content, volatile content, content identifiers, editing parameters, notifications, and/or user credentials to the computing devices 101a, 101b, . . . , 101n through the communication network 517. Computing devices 101a, 101b, . . . , 101n according to systems and methods of the invention may be operable to send and receive content, volatile content, editing parameters, notifications, content identifiers, volatility parameters, content requests, user credentials, and/or privacy parameters through the communication network 517 from the server 511 and other computing devices 101a, 101b, . . . , 101n.

Figure 7:
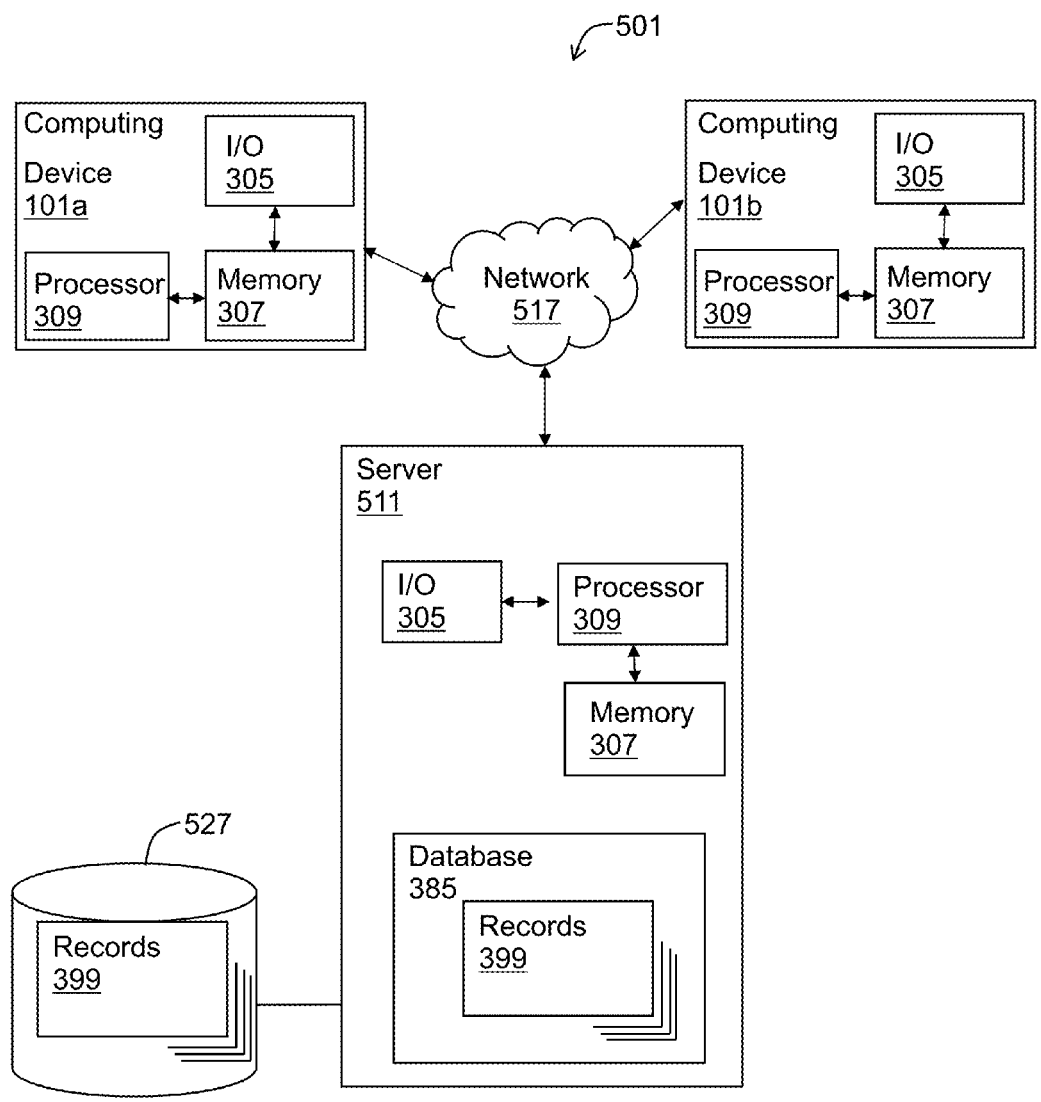
FIG. 7 gives a more detailed schematic of components that may appear within a system.

In a preferred embodiment, computing devices 101 according to the invention may provide a user, editor, or author, with an intuitive graphical user interface (GUI). See FIGS. 2-5. FIG. 7 gives a more detailed schematic of components that may appear within system 501. System 501 preferably includes at least one server computer system 511 operable to communicate with at least one computing device 101a, 101b via a communication network 517. Sever 511 may be provided with a database 385 (e.g., partially or wholly within memory 307, storage 527, both, or other) for storing records 399 including, for example, content, editing parameters, content identifiers, volatility parameters, user credentials, and/or privacy parameters where useful for performing the methodologies described herein. Optionally, storage 527 may be associated with system 501. A server 511 or computing device 101 according to systems and methods of the invention generally includes at least one processor 309 coupled to a memory 307 via a bus and input or output devices 305.

In certain embodiments, the role of the server within methods and systems of the invention may be performed by a distributed computing network or peer-to-peer file sharing network comprising a plurality of computing devices wherein the content, including components thereof, may be sent to, stored in, and/or sent from a plurality of computing devices. In such embodiments, content may be divided into individual components or subdivisions thereof which, in turn, may be received or downloaded from one or more separate computing devices in communication with the requestor's computing device via a communications network.

Content may be subdivided arbitrarily, or according to a scheme. An example of one scheme includes file size based division wherein a piece of content may be divided into a number of equally sized subdivisions where size is a measure of the amount of data (e.g., digital information), including, for example, subdivisions of 500 bytes, 1 kilobyte, 500 kilobytes, 1 megabyte, 10 megabytes, or 100 megabytes. Dividing the content and/or components thereof into subdivisions may allow for quicker data transfers (e.g., sending or receiving content; downloads or uploads) and the ability to pause and resume data transfers while retaining the already transferred subdivisions. Subdivisions may be arbitrary or based on separate components of the content (e.g., text component, audio component, video component, color information, privacy parameter, or editing parameter). In component based subdivisions, the subdivisions may each be substantially the same size or of varying sizes, for example to accommodate the size of each component.

In certain embodiments, content components and/or subdivisions thereof may be transferred among computing devices via a communication network. Content subdivision information may be included within an identifier. A requestor, having received a content identifier, may send a request to a plurality of computing devices acting as a server wherein each subdivision of the content (potentially subject to the privacy parameters described elsewhere) may be requested and received from any available source computing device that has a copy of the requested content subdivision available. The source computing devices may be selected based on a variety of factors including, for example, geographic proximity to the requestor, network access and speed, or network cost (e.g., on the same local network as a requestor, avoiding potential network or data transfer charges). Data transfer speeds may be increased through simultaneous downloads of content subdivisions by the requestor in cases where the bandwidth of the requestor is greater than that of a server comprising computing device.

In certain instances, individual subdivisions of a single piece of content may be requested, sent, and received at separate times and from different sources. In certain embodiments, the identifier may include information including data regarding division and assembly of the content or components thereof into subdivisions, security information, and/or tracking information such as possible sources of subdivisions or computing devices from which a particular subdivision may be requested and downloaded. In certain embodiments, the identifier may include security information such as a cryptographic hash which may be used to authenticate each subdivision as it is received.

In certain embodiments, content may be intelligently divided into components to enable efficient data transfers. For example, a video component may be compatible with several audio components in various languages (e.g., French, English, Mandarin, or Spanish) and a requestor wishing to view the video in Spanish could request and download the video component along with only the Spanish audio component, without wasting bandwidth on the other audio components.

In certain embodiments, systems and methods of the invention may relate so search functions wherein a requestor may input a query via an input device into a computing device which may review content, content identifiers, content components, or a catalog of any of the above in order to find data which matches the query. The computing device of the requestor may obtain such information from a server or another computing device and can display results on an output device connected to the requestor's computing device. In some embodiments, content may be searched for based on the information contained in the identifier allowing for faster cataloging and searching through stored content. For example, where an identifier contains information regarding component based subdivisions such as color information, a potential requestor may search for blue content and, instead of relying on tagging of blue images or a more complicated analysis of each file, a cursory search through of identifiers could recognize all available content with blue color information. In such embodiments, bandwidth and processing power may be utilized more efficiently.

In certain embodiments, privacy parameters may be applied to content searching so that content or components thereof, which a requestor does not have permission to observe, may optionally be restricted from the search so that a requestor is not shown such results and is furthermore not informed of the existence of such results. When applied to content components with multiple privacy parameters, this may result in a requestor being able to search for, receive, and/or observe one component of the content without being aware of the existence of another component of the content.

The viewer/synthesizer program may compile the content for viewing from subdivisions of content based on compiling information which may be contained, for example, in the identifier.

As one skilled in the art would recognize as necessary or best-suited for the systems and methods of the invention, systems and methods of the invention include one or more servers 511 and/or computing devices 101 that may include one or more of processor 309 (e.g., a central processing unit (CPU), a graphics processing unit (GPU), etc.), computer-readable storage device 307 (e.g., main memory, static memory, etc.), or combinations thereof which communicate with each other via a bus.

A processor 309 may include any suitable processor known in the art, such as the processor sold under the trademark XEON E7 by Intel (Santa Clara, Calif.) or the processor sold under the trademark OPTERON 6200 by AMD (Sunnyvale, Calif.).

Memory 307 preferably includes at least one tangible, non-transitory medium capable of storing: one or more sets of instructions executable to cause the system to perform functions described herein (e.g., software embodying any methodology or function found herein); data (e.g., portions of the tangible medium newly re-arranged to represent real world physical objects of interest accessible as, for example, a picture of an object like a motorcycle); or both. While the computer-readable storage device can in an exemplary embodiment be a single medium, the term "computer-readable storage device" should be taken to include a single medium or multiple media (e.g., a centralized or distributed database, and/or associated caches and servers) that store the instructions or data. The term "computer-readable storage device" shall accordingly be taken to include, without limit, solid-state memories (e.g., subscriber identity module (SIM) card, secure digital card (SD card), micro SD card, or solid-state drive (SSD)), optical and magnetic media, hard drives, disk drives, and any other tangible storage media.

Any suitable services can be used for storage 527 such as, for example, Amazon Web Services, memory 307 of server 511, cloud storage, another server, or other computer-readable storage. Cloud storage may refer to a data storage scheme wherein data is stored in logical pools and the physical storage may span across multiple servers and multiple locations. Storage 527 may be owned and managed by a hosting company. Preferably, storage 527 is used to store records 399 as needed to perform and support operations described herein.

Input/output devices 305 according to the invention may include one or more of a video display unit (e.g., a liquid crystal display (LCD) or a cathode ray tube (CRT) monitor), an alphanumeric input device (e.g., a keyboard), a cursor control device (e.g., a mouse or trackpad), a disk drive unit, a signal generation device (e.g., a speaker), a touchscreen, a button, an accelerometer, a microphone, a cellular radio frequency antenna, a network interface device, which can be, for example, a network interface card (NIC), Wi-Fi card, or cellular modem, or any combination thereof.

One of skill in the art will recognize that any suitable development environment or programming language may be employed to allow the operability described herein for various systems and methods of the invention. For example, systems and methods herein can be implemented using Perl, Python, C++, C#, Java, JavaScript, Visual Basic, Ruby on Rails, Groovy and Grails, or any other suitable tool. For a computing device 101, it may be preferred to use native xCode or Android Java.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for sharing content over a communication network, the system comprising:
    a computing device coupled to the communication network and comprising a tangible, non-transitory memory coupled to a processor, the computing device operable to:
        receive a content identifier from a second computing device through the communication network;
        (i) retrieve content associated with the content identifier from the non-transitory memory of the computing device or (ii) send a request for the content to a server through the communication network, send a user credential to the server through the communication network, and receive a copy of the content from the server through the communication network;
        receive, from a user, editing instructions modifying the content and create an editing parameter wherein the computing device is operable to synthesize and display edited content from the content and the editing parameter and to display the edited content;
        send the editing parameter to the second computing device wherein the second computing device is operable to synthesize and display the edited content from the editing parameter and a copy of the content stored on a tangible, non-transitory memory of the second computing device.

2. The system of claim 1 wherein the computing device is a mobile device, a wearable computing device, or an augmented reality device.

3. The system of claim 1 wherein the computing device is further operable to receive the user credential from a user.

4. The system of claim 1 wherein the editing parameter and the content have different authors.

5. The system of claim 1 wherein the copy of the content is of a format that cannot be copied or forwarded by the computing device.

6. The system of claim 1 wherein the content is an image, a video, a document, or an audio clip.

7. The system of claim 1 wherein the content has a first privacy parameter comprising a selection of one or more requesters authorized to view the content.

8. The system of claim 7 wherein the editing parameter has a second privacy parameter comprising a selection of one or more requesters authorized to view the content.

9. The system of claim 8 wherein the first and second privacy parameters are different.

10. The system of claim 8 wherein the first privacy parameter is set by an author of the content and the second privacy parameter is set by an author of the editing parameter.

11. The system of claim 8 wherein the first or second privacy parameter comprises a preselected amount of time for which the content or the editing parameter is readable by the one or more requesters.

12. The system of claim 7 wherein the first or second privacy parameter comprises a preselected number of views for which the content or the editing parameter is readable by the one or more requesters.

13. The system of claim 7 wherein the first or second privacy parameter comprises a restriction on copying or forwarding by the one or more requestors.

14. The system of claim 1 wherein the computing device is operable to display the editing parameter alone.

* * * * *